June 11, 1963 T. M. COLE 3,093,773
PANELBOARD WITH CIRCUIT PROTECTIVE DEVICES
Filed March 23, 1959 3 Sheets-Sheet 1
FIG. 1
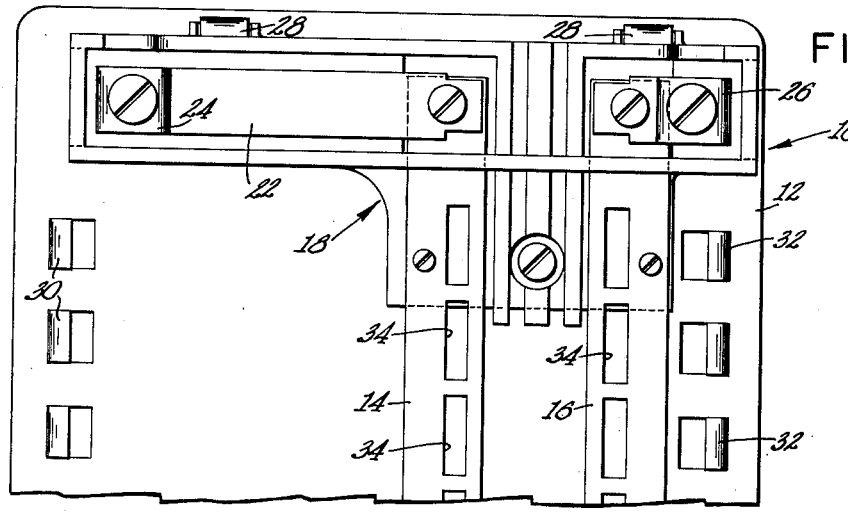
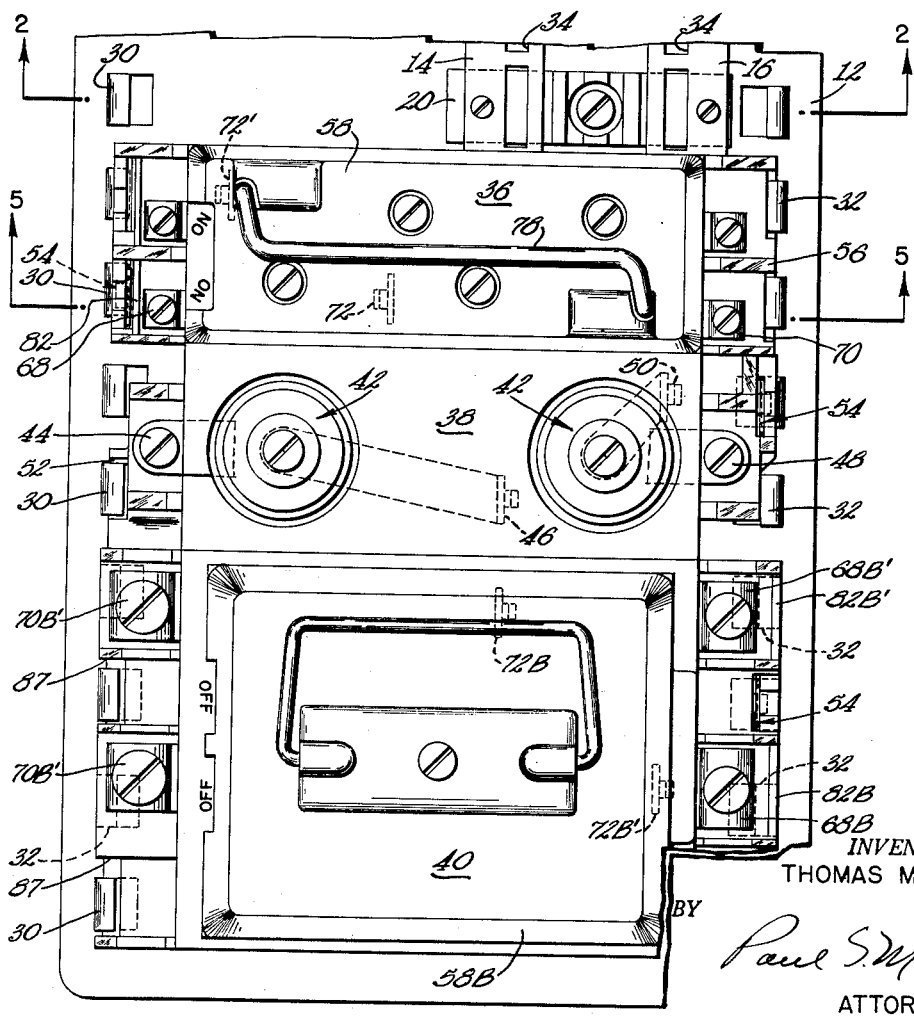
INVENTOR.
THOMAS M. COLE
BY Paul S. Martin
ATTORNEY

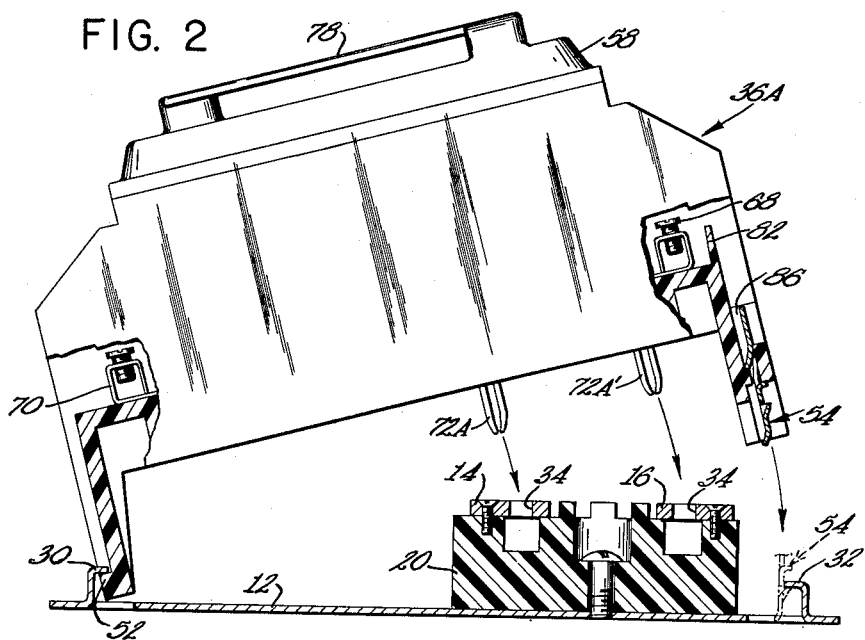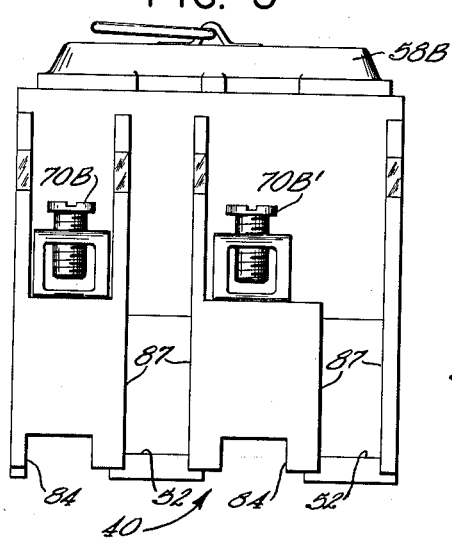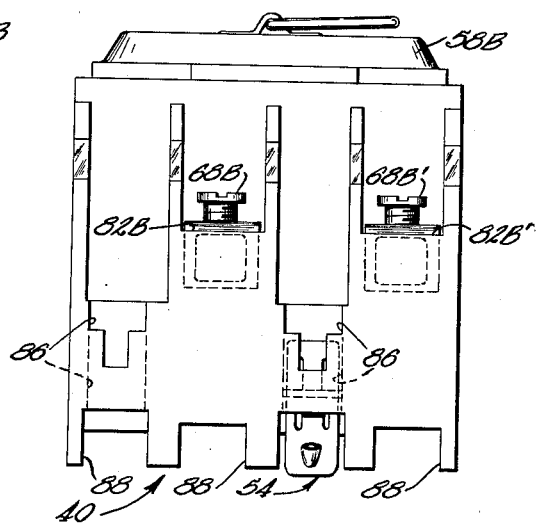

June 11, 1963 T. M. COLE 3,093,773
PANELBOARD WITH CIRCUIT PROTECTIVE DEVICES
Filed March 23, 1959 3 Sheets-Sheet 3

*INVENTOR.*
THOMAS M. COLE
BY Paul S. Martin
ATTORNEY

United States Patent Office 3,093,773
Patented June 11, 1963

3,093,773
PANELBOARD WITH CIRCUIT PROTECTIVE DEVICES
Thomas M. Cole, Harrison, N.Y., assignor to Federal Pacific Electric Company, a corporation of Delaware
Filed Mar. 23, 1959, Ser. No. 801,349
8 Claims. (Cl. 317—117)

The present invention relates to panelboards, and to circuit protective devices for such panelboards; and more particularly this invention relates to so-called fusible panelboards.

In one aspect the present invention is concerned with the provision of a novel panelboard having provision for receiving a complement of plug-in units for protection of branch circuits of a variety of different ratings. Features of this invention reside in the novel provisions for achieving a high degree of flexibility for such panelboards. This enables a variety of different forms of plug-in units to be assembled on standardized panelboards, as required by each particular installation. A further feature resides in plug-in circuit-protective units and in the corresponding construction of the panelboard for enabling mounting thereof in different dispositions on the panelboard, either to make connection with bus bars fixed to the panelboard, or, as may be desired, for such circuit protective units to be mounted on the panelboard without connection to such bus bars thereon. In an example, a panelboard may have a pair of bus bars available for a series of plug-in units, for furnishing branch-circuit protection where the branch circuits are supplied by the panelboard bus bars; and the same panelboard may also have provision for mounting circuit protective units in a different disposition for enabling a separate supply line, by-passing the bus bars, to provide protection for a branch circuit in an arrangement allowing for independent metering and/or control of the particular branch circuit apart from the power fed to the panelboard bus bars. As an example, it is frequently desired to furnish power from a panelboard to a number of branch circuits continuously on a 24-hour per-day basis, and separately it may be desired to furnish power for hot water heating only during certain hours of the night. The present invention provides a panelboard that is adaptable for either bus-bar supply to the all circuit protective units or the other circuit arrangement, or any required mixture of the two for different branch circuits.

The invention will be readily appreciated and further objects and features of novelty will be apparent from the following detailed description of an illustrative embodiment of the invention which is shown in the accompanying drawings forming a part of the disclosure of the illustrative embodiment. In the drawings:

FIGURE 1 is the plan view of a panelboard with a number of circuit protective devices mounted thereon, a portion of the panelboard being left free of circuit protective devices for illustrative purposes;

FIGURE 2 is a cross-sectional view of the panelboard of FIGURE 1 along the line 2—2, showing the manner of assembly of a circuit protective device thereto;

FIGURES 3 and 4 are views of the lower-most circuit protective device in FIGURE 1, as viewed from the left end and from the right end thereof, respectively;

Figure 5:
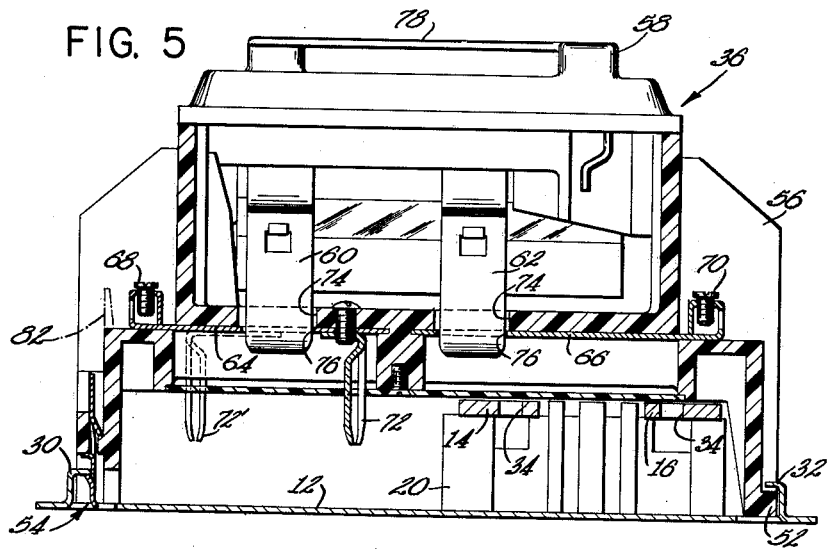
FIGURE 5 is a cross-sectional view along the line 5—5 in FIG. 1.

Referring now to the drawings, a panelboard 10 is shown having a sheet metal plate 12 bearing a pair of bus bars 14 and 16. These bus bars are spaced away from the base of plate 12 by insulating supports including the line barrier insulator 18 and a support insulator 20. It will be understood that additional insulators 20 are provided at reasonably spaced intervals along bus bars 14 and 16, depending on the length of the bus bars. The bus bars are screwed to the insulators and the insulators in turn are fastened to plate 12 by screws and by suitable integral metal tongues 28. Bus bar 14 is connected to one line terminal bar 22 and to solderless connector 24 forming one line terminal while the second bus bar 16 is similarly connected to another like line terminal 26. These line terminals 24 and 26 are to receive line wires through suitable holes in the upstanding end walls of line barrier insulator 18.

A first row of hooks 30 extends along the left-hand edge of plate 12 and an identical series of hooks 32 extends along the right-hand edge of plate 12. Hooks 30 and 32 are tongues that project integrally from plate 12. Bus bars 14 and 16 contain a series of slots 34 which constitute formations for plug-in cooperation with the plug-in terminals of the circuit protective devices to be mounted on the panelboard. Each plug-in formation 34 is interposed between a confronting pair of transversely aligned hooks 30 and 32. Further, formations 34 in bus bar 14 are spaced along a line parallel to the two rows of hooks 30 and 32, and the formations 34 in bus bar 16 are similarly spaced along a line parallel to the two rows of hooks 30 and 32. Both rows of bus plug-in terminals or formations 34 are disposed to the right of the center line between the two rows 30 and 32 of the hooks, the bus terminals 34 being thus asymmetrically located relative to the center line.

The panelboard in FIGURE 1 will naturally receive a suitable number of circuit protective devices whose ratings and mounting configurations are those suitable to the various circuits to be protected. In FIGURE 1 three different circuit protective devices 36, 38 and 40 are shown. Units 36 and 38 occupy the area of the panelboard allotted to two hooks 30, two hooks 32, and to two corresponding line or bus terminal formations 34 in each bus bar 14, 16. Plug-in circuit protective device 40 occupies four such areas. Each of the devices 36, 38 and 40 contains two fuses, one fuse for each of two branch circuits protected by such device 36, 38 or 40. Unit 38 has a pair of receptacles 42 for the conventional plug fuses. The terminals of the left-hand fuse receptacle are connected, respectively, to a branch circuit terminal or solderless connector 44 and to a plug-in terminal 46 extending from the bottom of the unit. The right-hand fuse has one terminal extending to a solderless connector 48 for connection to a branch-circuit wire, and additionally the right-hand fuse is connected to a plug-in terminal 50. Plug-in terminals 46 and 50 are in alignment with the respective mating terminals 34 of the respective bus bars 14 and 16, so that a plug-in unit 38 provides branch-circuit protection for loads that are energized by the two different bus bars 14 and 16.

At its lower left-hand corner, unit 38 has a foot 52 which underlies one of the hooks 30, and at its upper right-hand corner unit 38 has a downward projecting spring clip 54 that is in locking engagement with a correspondingly positioned hook 32. Elements 52, 30, 54 and 32 constitute fastening means for holding the circuit protective devices mounted on the panelboard, these elements being of standardized form for all of the plug-in protective devices and is discussed in greater detail in connection with FIGURES 2 to 8 inclusive.

Unit 36 is of a form designed for a pair of cartridge fuses contained in a pull-out unit. As seen in FIGURE 5, unit 36 contains a unitary base 56 of molded insulation. A pull-out unit 58 is received in a corresponding cavity in molded base 56, this pull-out unit having spring clips 60 and 62 for tightly embracing the terminals of a cartridge fuse (not shown). After encircling the cylindrical terminals of the cartridge fuse, elements 60 and 62 extend as resilient blades into tight engagement in slots in conductors 64 and 66 fastened to molded base 56. Conductors 64 and 66 extend to solderless connectors or terminals 68 and 70 at the opposite ends of the unit. Conductor 64 additionally has a plug-in terminal 72 extending downward therefrom, terminals 68 and 72 thereby having "solid" electrical interconnection, whereas these two terminals 68 and 72 extend to connector 70 only through the cartridge fuse between terminals 60 and 62.

Figure 6:
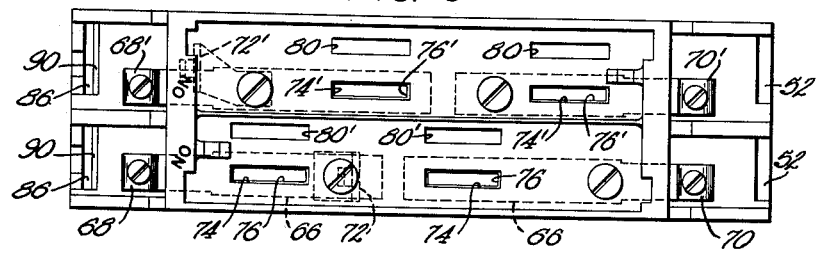
FIGURE 6 is the plan view of the fusible protective device of FIGURE 5 with the pull-out fuse unit removed.

The blades extending from fuse clips 60 and 62 of the pull-out unit penetrate through slots 74 in the molded base 56 and enter into slots 76 in conductors 64 and 66. The base 56 is seen in FIGURE 6 to have a duplicate upper section, in which primed numerals are used corresponding to those described in connection with FIGURES 5 and 6 up to this point. Pull-out 58 has another set of fuse clips for a second fuse, corresponding to clips 60 and 62.

The blades extending from fuse clips 60 and 62 serve as a means for disconnecting the circuit extending between terminal 70 at one side of the fuse and terminals 68 and 72 at the other side of the fuse. The fuse pull-out 58 may be removed by using handle 78 and pulling it from the position shown. This pull-out is reversible end to end so that the blades of fuse clips 60 and 62 can enter "dead" passages 80 in the molded base 56 of insulation. Correspondingly, the blades of the other fuse clips (not shown) would enter passages 80' in their disconnected position. The pull-out thus accomplishes the basic functions of providing circuit protection and of interrupting the circuit, as may be required for two circuits.

As seen in FIGURE 5, molded base 56 has a foot 52 (corresponding to foot 52 of unit 38) which is retained against panel 12 by the overlying hook 32. This hook 32 and foot 52 cooperate with each other in the manner illustrated in FIGURE 2 for hook 30 and foot 52, in the nature of a separable hinge when the unit is being installed. In FIGURE 5 spring clip 54 cooperates with hook 30 of the panel 12 for fastening the opposite end of the unit 36 to the panelboard.

Unit 36 in FIGURE 2 is a duplicate of unit 36 in FIGURE 5. Unit 36A is shown in the process of being mounted with plug-in terminals 72A and 72A' approaching bus bars 14 and 16, respectively. The terminal 70 of plug-in unit 36A appears at the left, remote from the bus bars 14 and 16, and the solderless connector 68 appears at the right, relatively close to the bus bars 14 and 16. In that type of installation, terminal 68 is inaccessible for insertion of a wire. A break-away wall 82 obstructs any such wire. When installed, circuits would extend from bus bars 14 and 16 through plug-pin terminals 72A and 72A' to the respective terminals 70, through interposed fuses contained within unit 36A.

Panelboard hooks 30 and 32 are seen in FIGURE 5 to cooperate reversely with the fastening elements 52 and 54 in FIGURE 5, unit 36 in FIGURE 5 being installed or mounted with its plug-in terminals 72 and 72' off-center between hooks 30 and 32. Plug-in terminals 72 and 72' are off-center in the opposite direction of the off-centered disposition of bus bars 14 and 16. In that type of installation, terminals 72 and 72' are well protected, being downwardly directed and thus enclosed by the molded base 56 of unit 36. Wall 82 of unit 36A shown in FIGURE 2 is removed from the place designated 82 in phantom lines in FIGURES 5, solderless connector 68 being thus exposed for receiving a wire from the branch circuit. Terminal 70 is available, accordingly, for connection to a supply for an off-peak water heater or the like, and can be energized independently of bus bars 14 and 16.

Regardless of whether unit 36A is installed in its "normal" condition in which its plug-in terminals engage the bus bars 14 and 16, or in the "reverse" configuration illustrated in FIGURES 1 and 5, the panelboard elements 30 provide for retention of the units on the panelboard. These elements 30 are additionally confined between the lateral limits of foot 52 and of the passage containing the spring clip 54, being thereby located on the panelboard in the direction perpendicular to the lateral faces of the units as seen in FIGURES 2 and 5. This may be better appreciated in connection with the end views of unit 40 which appear in FIGURES 3 and 4. At both its ends, unit 40 has a series of cut-outs or recesses 84 which admit and are thereby located by the hooks 30 and 32 of the panelboard whereas walls 87 at the endwise limits of a pair of feet 52 correspondingly provide for resistance to displacement of the unit 40 to the right and left as viewed in FIGURE 3. Similarly, unit 40 as seen in FIGURE 4 has a series of cut-outs or recesses 88 for admitting and thereby interengaging with a series of hooks 30 or 32, depending upon whether the unit 40 is installed in one configuration with its feet 52 in engagement with hooks 30 or with its feet 52 in engagement with hooks 32. Incidentally, unit 40 has a pair of terminals 68B and 68B' obstructed by protective walls 82B and 82B'. Unit 40 further has a pair of terminals 70B and 70B' at its opposite end, corresponding to the two terminals 70 and 70' of unit 36.

Figure 7:
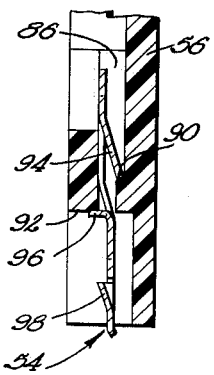
FIGURE 7 is an enlarged cross-sectional view of the lower left-hand portion of the device in FIGURE 5.
Figure 8:
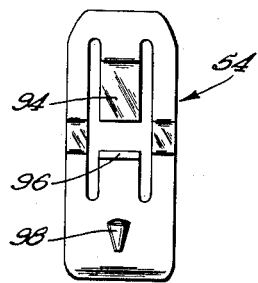
FIGURE 8 is an elevation of a spring clip, as viewed from the left in FIGURE 7.

Each plug-in unit has one spring clip 54 although, as indicated in FIG. 4, multiple passages 86 are provided for accommodating multiple spring clips. The physical details and the mounting of these spring clips is best illustrated in FIGURES 7 and 8.

The molded base 56 having a passage 86 therein has a shoulder 90 facing upward and another shoulder 92 facing downward. Spring clip 54 has a tongue 94 that engages shoulder 90 and presses the upper portion of the spring clip against the left-hand wall of passage 86 as viewed in FIGURE 7. An abutment 96 extends across shoulder 92. The spring clip as viewed in FIGURE 8 can be inserted into the passage 86 from below, tongue 94 snapping over shoulder 90 just as abutment 96 engages shoulder 92. In this way, the spring clip becomes captive. Spring clip 54 has a locking detent portion 98 projecting outwardly, at a level to engage the lower surface of hook 30 or 32 of the panelboard. Detent portion 98 is resiliently supported by the spring clip so as to yield during the final swinging motion of the unit being mounted represented in FIGURE 2, the spring detent finally clicking under hook 30 of the panelboard (or 32 depending on the installation chosen). The interlocking engagement of spring detent 54 with a panelboard hook effects positive locking. The hook completely conceals the resilient portion of the detent from above; and consequently the plug-in units can be released, as for substitution of a unit of higher rating, only by access to the back of panel 12.

As seen in FIGURE 1, unit 40 is installed with its two plug-in terminals 72B and 72B' in cooperative engagement with the formations 34 of bus bars 14 and 16 respectively. In this condition pull-out unit 58B of unit 40 (of construction similar to unit 36) can be inserted in either of two conditions by endwise reversal for connecting or disconnecting the terminals 70B and 70B' to the bus bars. The whole unit 40 can however be reversely mounted on panel 12 in the manner illustrated in FIGURE 5 for unit 36, in which case the terminals 72B and 72B' would be to the left of the center of the panel board as shown in FIGURE 1 and out of engagement with the bus bars. Unit 40 is of considerably greater current-protective capacity than unit 36, these units being respectively for 30 ampere cartridge fuses and 60 ampere cartridge fuses in a commercial form of the embodiment. Still larger units can be received on panelboard 10, to give selective switching and circuit protective features for branch circuits when the plug-in terminals of the unit are disposed to engage the bus bars; and additionally the flexibility of installation makes possible additional circuit connections with corresponding features of switching and circuit protection when the unit is installed in its "reverse" disposition.

The foregoing represents a preferred embodiment of the present invention and is evidently susceptible of a latitude of modification, rearrangement and varied application. It is appropriate therefore that the invention be broadly construed in accordance with its full spirit and scope.

I claim:

1. In combination, a panelboard bearing a pair of parallel bus bars and a plurality of elongated circuit protective devices disposed crosswise of said bus bars, each of said circuit protective devices including a body of molded insulation having longitudinally separated fastening elements at the bottom thereof, and each having a pair of plug-in terminals directed downwardly and spaced apart lengthwise and transversely of the circuit protective device, said plug-in terminals both being disposed off-center relative to the lengthwise spacing between said longitudinally separated fastening elements and a pair of solderless connectors for wire at each end of said protective device, said plug-in terminals having a solid electrical connection to one pair of said solderless wire connectors at one end of the circuit protective device and said body of molded insulation having break-away parts obstructing said one pair of solderless conductors, said circuit protective device including a pair of means providing circuit protection interposed between respective solderless wire connectors at the opposite ends of said device, said fastening element adjacent one of said pairs of solderless connectors including a spring locking detent and the other of said fastening elements being in the form of a separable hinge element integral with said body of molded insulation, said panelboard having two rows of confronting hooks parallel to said bus bars and disposed to cooperate respectively with said spring detent and with said separable hinge, said two rows of hooks being spaced apart along said bus bars in accordance with said fastening elements of said circuit protective devices, said hooks in both said rows being cooperable as mating hinge parts with the separable hinge elements of said circuit protective devices, said hooks also being of a form to lock to said spring detents, said bus bars being disposed off-center between said rows of hooks, said circuit protective devices being accordingly reversible end for end to assume either of two positions transverse of the bus bars and being retained by said fastening elements to said panel board in either disposition thereof, said bus bars having formations complementary to the plug-in terminals of said circuit protective devices and cooperable therewith when mounted on said panelboard in one of said dispositions, said plug-in terminals of said circuit protective devices being well clear of said bus bar formations in the reverse disposition of said circuit protective devices.

2. The combination in accordance with claim 1 including a circuit protective device having a fuse pull-out reversibly receivable in said base for selectively breaking the circuit through the device or for providing a fused circuit therethrough.

3. A circuit protective device including an elongated body of molded insulation having longitudinally separated fastening elements at the bottom thereof, a pair of plug-in terminals directed downwardly and spaced lengthwise and transversely of the circuit protective device, said plug-in terminals both being disposed off-center relative to the space between said longitudinally separated fastening elements, and a pair of solderless connectors for wire at each end of said elongated body, said plug-in terminals having respective solid electrical connections to one pair of said solderless connectors at one end of said elongated body, said elongtated body having break-away portions obstructing said one pair of said solderless connectors, said circuit protective device including fuse receptacles interposed between respective ones of said pairs of solderless connectors, said fastening element adjacent said plug-in terminals being in the form of a spring locking detent and said fastening element remote from said plug-in terminals being in the form of a separable hinge element.

4. In combination, a plurality of elongated circuit protective devices each having longitudinally separated fastening elements, wire-connecting terminals at the ends thereof and at least one plug-in terminal at the bottom thereof and disposed off-center relative to said fastening elements, said plug-in terminal having a direct connection to one of said wire connecting terminals, and a panelboard having fastening means extending along two laterally spaced lines for cooperation with said fastening elements in either of two reversible mounting positions of each said device, said panelboard having at least one bus extending parallel to said fastening means and having engageable portions thereof positioned off-center between said fastening formations for cooperation with respective plug-in terminals of said circuit protective devices or for isolation therefrom, depending on the selected mounting position.

5. In combination, a plurality of elongated circuit protective devices each having longitudinally separated fastening elements, wire-connecting terminals at the ends thereof and at least one plug-in terminal at the bottom thereof and disposed off-center relative to said fastening elements, said plug-in terminal having a direct connection to one of said wire-connecting terminals, at least one of said circuit protective devices including a removable fuse holder reversibly insertable in said device either to provide or to interrupt a circuit through the device, and a panelboard having fastening means extending along two laterally spaced lines for cooperation with said fastening elements in either of two reversible mounting positions of each said device, said panelboard having at least one bus extending parallel to said fastening means and having engageable portions thereof positioned off-center between said fastening formations for cooperation with respective plug-in terminals of said circuit protective devices or for isolation therefrom, depending on the selected mounting position.

6. In combination, a circuit protective device having a vertical passage therein substantially perpendicular to the bottom surface thereof and having abutment shoulders, a panelboard having a surface against which the bottom surface of said device is to rest and having an opening with adjacent means providing an abutment shoulder, and a spring detent secured to said circuit protective device and effective to secure said device to said panelboard, said spring detent being a generally straight member including a laterally extending abutment (96) engaging one of the shoulders of said device, a tongue (94) extending longitudinally of said detent but at a slight angle relative thereto and generally toward said abutment (96) and engaging the other one of said abutment shoulders of said circuit protective device, so that said detent is captive in said device, said detent including a locking detent portion (98) having locking engagement with said abutment shoulder of said panelboard, said tongue and said detent portion being at opposite sides of said abutment.

7. In combination, a panelboard and a plurality of elongated over-current protective devices mounted thereon, each of said overcurrent protective devices being elongated and having longitudinally separated fastening elements at the bottom thereof, one of said fastening elements being a locking spring detent having a downward extending portion arranged for lateral resilient deflection and having a lateral locking shoulder facing upward, and the other of said fastening elements being in the form of a separable hinge element, and each of said overcurrent protective devices having at least one plug-in terminal at the bottom thereof, said panelboard having two rows of fastening formations along two lines spaced from each other in accordance with the separation of the fastening elements of said devices, at least one row of said fastening formations being formed for hinge-like cooperation with the separable hinge elements of said protective devices and the other of said fastening formations being in the form of sheetmetal parts substantially concealing the downwardly extending portion of the locking spring detent and said sheetmetal parts having edge portions in locking engagement with said upward facing shoulders of the locking detents, said locking shoulder and said edge portion being related to each other to provide substantially positive locking engagement preventing lifting of said device away from said panelboard and said fastening formations cooperating with said device in a manner preventing lateral bodily shift of the device in the direction to effect release of the locking spring detent, said panelboard having openings at the bottom thereof for providing restricted access to said locking detents from the rear of the panelboard for effecting lateral deflection and release of the detents, said panelboard having at least one row of bus terminals parallel to said fastening formations and positioned for cooperation with said plug-in terminals of said overcurrent protective devices.

8. A circuit protective device adapted for mounting on a panelboard, said device including an elongated body of insulation having longitudinally separated fastening elements at the bottom thereof, said fastening elements including a foot-like element cooperable with a panelboard hook in the manner of a separable hinge, and a downwardly directed laterally resilient spring detent having an upwardly directed locking shoulder formed to effect positive locking engagement with a confronting panelboard hook, a downwardly directed plug-in terminal located between said fastening elements and disposed off-center longitudinally, a terminal connector at one end of said body for receiving an external circuit wire, means providing overcurrent protection interposed between said plug-in terminal and said connector, and an additional terminal connector for an external circuit wire, said additional connector being disposed on said body remote from said first-mentioned connector and having a solid electrical connection to said plug-in terminal.

References Cited in the file of this patent

UNITED STATES PATENTS

| | | |
|---|---|---|
| 2,497,523 | Warkentin | Feb. 14, 1950 |
| 2,593,961 | Ballou | Apr. 22, 1952 |
| 2,645,725 | Miller | July 14, 1953 |
| 2,737,613 | Morris | Mar. 6, 1956 |
| 2,760,174 | Burtt et al. | Aug. 21, 1956 |
| 2,829,317 | Timmermans | Apr. 1, 1958 |
| 2,869,098 | Sauer | Jan. 13, 1959 |
| 2,883,586 | Christensen | Apr. 21, 1959 |
| 2,895,119 | Montgomery | July 14, 1959 |
| 2,899,669 | Johanson | Aug. 11, 1959 |
| 2,910,630 | Hammerly | Oct. 27, 1959 |
| 2,914,708 | Edmunds | Nov. 24, 1959 |
| 2,916,675 | Middendorf | Dec. 8, 1959 |
| 2,929,966 | Bangert | Mar. 22, 1960 |

FOREIGN PATENTS

| | | |
|---|---|---|
| 1,024,139 | Germany | Feb. 13, 1958 |

OTHER REFERENCES

"The Magic E," publication, Federal Noark, catalog 1000 A, July 1953. The Federal Pacific Electric Co.